United States Patent [19]

Baade et al.

[11] Patent Number: 5,298,577
[45] Date of Patent: Mar. 29, 1994

[54] CONTINUOUS PROCESS FOR THE PRODUCTION OF ETHYLENE/VINYL ESTER TERPOLYMERS

[75] Inventors: Wolfgang Baade, Dormagen; Werner Obrecht, Moers; Christian Ohm; Rudolf Casper, both of Leverkusen; Kurt P. Neurer, Koenigswinter; Gerd Sylvester, Leverkusen, all of Fed. Rep. of Germany

[73] Assignee: Bayer AG, Leverkusen, Fed. Rep. of Germany

[21] Appl. No.: 448,908

[22] Filed: Dec. 12, 1989

[30] Foreign Application Priority Data

Dec. 23, 1988 [DE] Fed. Rep. of Germany ....... 3843563
Jun. 30, 1989 [DE] Fed. Rep. of Germany ....... 3921479

[51] Int. Cl.⁵ .................... C08F 2/06; C08F 218/08
[52] U.S. Cl. .................... 526/65; 526/330; 526/916
[58] Field of Search .................... 526/65, 916, 330

[56] References Cited

U.S. PATENT DOCUMENTS

| | | | |
|---|---|---|---|
| 3,325,460 | 6/1967 | Schellenberg et al. | 526/65 |
| 4,485,225 | 11/1984 | Satoh et al. | 526/74 |
| 4,486,579 | 12/1984 | Machon et al. | 526/65 |
| 4,594,393 | 6/1986 | Pritchett et al. | 526/916 |

Primary Examiner—Joseph L. Schofer
Assistant Examiner—Tom Weber
Attorney, Agent, or Firm—Connolly and Hutz

[57] ABSTRACT

A solution polymerisation process carried out continuously in a cascade produces high molecular weight gel-free ethylene terpolymers having on the one hand high resistance to fuels, oils and organic solvents and on the other hand high flexibility even at low temperatures when narrow ranges are adhered to in respect of solvent content, pressure, temperature control and degree of conversion.

3 Claims, No Drawings

CONTINUOUS PROCESS FOR THE PRODUCTION OF ETHYLENE/VINYL ESTER TERPOLYMERS

The invention relates to a continuous process for the production of ethylene/vinyl ester terpolymers having improved properties by solution polymerisation, to new ethylene/vinyl ester terpolymers and to their use for the production of vulcanisates. "Terpolymers" for the purposes of the invention are understood to be all copolymers containing copolymerised units of at least three different monomers; accordingly this term also refers to polymers consisting of four or more monomers.

It is known that ethylene and vinyl esters such as vinyl acetate can be radically polymerised in varying proportions with random distribution of the copolymerised monomer units. The copolymerisation can basically be carried out by the following three processes:
1. emulsion polymerisation,
2. solution polymerisation and
3. high pressure bulk polymerisation.

Ethylene/vinyl ester copolymers having a low vinyl ester content can be produced economically by high pressure bulk polymerisation (H. Bucka, R. Nitzsche, H. Onderka, Plaste and Kautschuk 30, 6, pages 302–305 (1983)), Polymerization is generally carried out under pressures of 1000 to 3000 bar and at temperatures of 150° to 280° C. Products having vinyl ester contents of up to 30% by weight produced by this process can be used as hot melt adhesives and as flow improvers for crude oils and middle distillates and for cable sheaths.

The high pressure process is not suitable for the production of ethylene/vinyl ester copolymers having medium to high vinyl ester contents since it is difficult to obtain copolymers having high molecular weights and high Mooney viscosities at the polymerisation temperatures required for this process.

Ethylene/vinyl ester copolymers having vinyl ester contents of higher than 70% by weight are predominantly produced by emulsion polymerisation. The usual conditions are pressures of 30 to 500 bar and temperatures of 20° to 100° C. The properties of these ethylene/vinyl ester copolymers are determined by residues of emulsifier which cannot be removed completely and render the copolymers unsuitable for a number of applications.

Ethylene/vinyl ester copolymers having a vinyl ester content of at least 30% by weight can also be produced by a solution polymerisation process under medium pressures. The solvents used are, for example, tert.-butanol or mixtures of tert.-butanol, methanol and hydrocarbons in which the polymers also remain in solution during the polymerisation process (DE-AS 1,126,613; 1,126,614 and 1,495,767, DE-OS 3,323,531, GB-PS 807,112 and 843,974, FR-PS 1,189,387; 1,225,704 and 1,238,589, U.S. Pat. Nos. 2,396,785 and 2,947,735).

U.S. Pat. No. 4,485,225 discloses a continuous solution polymerisation process for the production of ethylene/vinyl acetate copolymers, in which a third monomer can also be used which is preferably used in quantities of 0 to 10 mol %, based on vinyl acetate (col. 3, line 44). The solvent content is preferably below 20% by weight (col. 2, lines 23/24), the pressures do not, according to the examples, rise above 56 bar (Example 2), and, according to the examples, the process is carried out in only one reaction vessel.

In the examples neither the molecular weights obtained nor the viscosities of the polymers obtained are mentioned and gel-free products are evidently only obtained at degrees of conversion which do not exceed 55% (based on vinyl acetate). Thus U.S. Pat. No. 4,485,225 does not provide an economical process for the production of high molecular weight, but nevertheless gel-free, ethylene terpolymers.

The resistance of ethylene/vinyl ester copolymers and vulcanisates thereof to solvents, fuels and oils does not always meet all requirements. It has so far not been possible to solve this problem by copolymerising suitable termonomers since an improvement in resistance to organic solvents, motor fuels and lubricating oils is usually only achieved at the expense of flexibility at low temperatures. There was therefore a need for an economical process for the continuous production of high molecular weight gel-free ethylene/vinyl ester terpolymers having high resistance to organic solvents, motor fuel and oil and at the same time a high degree of flexibility even at low temperatures.

It has surprisingly been found that high molecular weight gel-free ethylene terpolymers, which combine high resistance to organic solvents, motor fuels and oils with a high degree of flexibility even at low temperatures, both in the non-vulcanised and the vulcanised state, can be obtained by means of a solution polymerisation process which is carried out continuously in a cascade and has specific parameters (solvent content, pressure, temperature control and degree of conversion).

The invention therefore relates to a continuous solution polymerisation process for the production of gel-free ethylene terpolymers having a molecular weight $\overline{M}_w$, determined as a weight average, of 50,000 to 1,500,000, preferably 200,000 to 500,000, and containing
a) 1 to 59% by weight of copolymerised ethylene,
b) 40 to (99-c) % by weight of copolymerised units of at least one vinyl ester of the formula $$R^1CO-\underset{\underset{O}{\|}}{C}=CH_2 \atop \overset{R^2}{|}$$

wherein
$R^1$ denotes $C_1$-$C_6$-alkyl and
$R^2$ denotes hydrogen; $C_1$-$C_6$-alkyl which can be substituted by —CN, —SCN or halogen (fluorine, chlorine, bromine), and
c) 1 to 59% by weight of copolymerised units of at least one monomer of the formulae

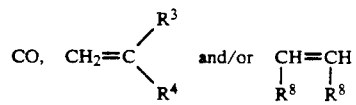

wherein
$R^3$ denotes hydrogen, $C_1$-$C_6$-alkyl, —CN or halogen (fluorine, chlorine, bromine), or $COOR^5$,
$R^4$ denotes —COOH, —CONH$_2$, —COOCH$_2$OH,

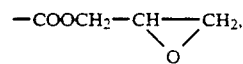

—COOCH$_2$CH=CH$_2$, —COOCH$_2$CH$_2$Cl, —CONHCH=CH$_2$, —COOCO—C(CH$_3$)=CH$_2$, —COOR$^5$, —CN or halogen (fluorine, chlorine or bromine), R$^5$ denotes [R$^6$O]$_n$R$^7$, R$^6$ denotes C$_1$-C$_6$-alkylene, preferably C$_2$— and/or C$_3$-alkylene, R$^7$ denotes hydrogen, C$_1$-C$_6$-alkyl, —CN, —OR$^9$, —COR$^9$ or halogen (fluorine, chlorine or bromine), R$^8$ denotes —CO$_2$R$^5$, —CN or halogen (fluorine, chlorine or bromine), or both R$^8$ substituents together denote —CO—O—CO—, —CO—N-H—CO— or

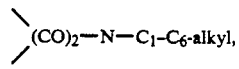

R$^9$ denotes hydrogen or C$_1$-C$_6$-alkyl and n denotes an integer from 1 to 10, the percentages in each case relating to the sum of components a+b+c, characterised in that the reaction is carried out in a cascade of 3 to 10 —preferably 5 —reactors, in a polar organic solvent with a solvent concentration, based on the sum of monomers+solvent, of higher than 20 to 75% by weight, under pressures of 100 to 1,000 bar, at temperatures of 30° to 150° C., preferably 50° to 90° C., in the presence of 0.02 to 1.5% by weight, based on the quantity of monomers employed, of a polymerisation initiator, until a degree of conversion, based on the vinyl ester b), of 40 to 90% by weight, preferably 60 to 80% by weight, is reached.

Preferred vinyl esters b) are, for example, vinyl propionate and vinyl butyrate, but preferably vinyl acetate.

Preferred termonomers c) include, for example, acrylic acid, acrylamide, hydroxymethyl acrylate, glycidyl acrylate, allyl acrylate, β-chloroethyl acrylate, N-vinyl acrylamide and the corresponding methacrylic acid derivatives. The termonomers c) are preferably used in quantities of higher than 10, preferably higher than 25, and most preferably higher than 50 mol %, based on the vinyl ester b).

It has also been found that by copolymerising small quantities of d) compounds having at least two acryloyl or methacryloyl groups per molecule terpolymers can be obtained which can be processed to give vulcanisates having increased strength.

A particular embodiment of the process according to the invention is therefore characterised in that the polymerisation is carried out in the presence of d) 50 ppm to 1% by weight, preferably 200 ppm to 1% by weight, based on the quantity of polymerisable monomers used, of (meth)acryloyl compounds containing at least 2 acryloyl or methacryloyl groups per molecule.

(Meth)acryloyl compounds preferred for this particular embodiment include compounds having a molecular weight of 126 to 1,000, preferably 126 to 500, such as for example acrylic anhydride, methacrylic anhydride, the acrylates and methacrylates of polyhydric, in particular di- and trihydric, aliphatic, cycloaliphatic, araliphatic and aromatic alcohols having 2 to 24 C-atoms per molecule, such as for example acrylates and methacrylates of ethylene glycol, propane-1,2-and -1,3-diol, butane-1,2-, -1,3-, -2,3- and -1,4-diol, neopentyl glycol, hexanediols, in particular hexane-1,6-diol, cyclohexane-1,4-diol, 1,4-bis(hydroxymethyl)-cyclohexane, hydroquinone, resorcinol, bisphenol-A, ethoxylated bisphenol-A and hydroquinone-di(β-hydroxyethyl)-ether; and also the acrylates and methacrylates of glycerol, trimethylolethane and -propane and phloroglucinol.

Preferred (meth)acryloyl compounds are also acrylates and methacrylates of polyether polyols, and preferably of polyethylene and polypropylene glycols containing 1 to 20, preferably 1 to 12, ether oxygen atoms per molecule; and in particular the acrylates and methacrylates of di- and triethylene glycol and of di-and tripropylene glycol.

The gel content of the ethylene terpolymers can be determined by 24-hour extraction with dichloromethane in a Soxhlet extractor; a "gel-free" product for the purposes of the invention must not contain any more than 0,2% by weight of insoluble residue, based on the terpolymer.

The (individual) molecular weights are determined as described below by gel permeation chromatography in conjunction with viscometry and turbidimetric titration:

The samples are prepared with a concentration of 10 g/l in CH$_2$Cl$_2$ and ultracentrifuged at room temperature after 24 hours (1 hour at 20,000 min$^{-1}$). The isolated sediment is dried in vacuo at 60° C. and weighed ($\gamma_{UC}$). The limiting viscosity number ([η]$_{sol}$) of the sol solution is also determined in CH$_2$Cl$_2$ at 25° C. using an automated Ubbelohde capillary viscometer.

The gel-chromatographic separation is carried out in 8 series-connected Styragel ® columns (pore size 10$^2$/10$^2$/10$^3$/10$^3$/10$^4$/10$^4$/10$^5$/10$^6$ nm; total length: 976 cm). 2.0 ml of the sol solution diluted with CH$_2$Cl$_2$ to c=2 g/l are filtered and passed through a membrane filter with a pore diameter of 1.2 μm and eluted with CH$_2$Cl$_2$ (flow rate: 0.5 ml/min). A refractometer is used as the concentration-proportional detector. An IR filter photometer is used for the specific detection of the acetate band, at λ=5.76 nm (λ=1.736 nm).

In conjunction with the gel-chromatographic separation, 5 ml of the eluate—equal to one count in the gel chromatogram—are in each case automatically measured for their viscosity in a modified Ubbelohde viscometer, after which turbidimetric titration is carried out. For the titration the eluate is passed into a cuvette arranged in a blackened metal housing and the precipitating agent (methanol) is added continuously at a rate of 2 ml/min. with the aid of a flow inducer. Altogether 15 ml of precipitating agent are added. The components are rapidly mixed with the aid of a stirrer (8,000 r.p.m.). The cuvette is illuminated by means of a light emission diode. The stray light intensity of the mixture of solvent and precipitating agent is measured with an optical device at an angle of 20° C. to the primary ray and as a function of the quantity of precipitating agent metered in.

During the course of a gel-chromatographic examination 75 such eluate fractions are obtained, about 20 to 30 of which contain the partitioned sample. The calculation of the molecular weight distribution from the refractometric and viscometric data is carried out by means of known constants with the aid of a universal calibration curve according to the Benoit method (H. Benoit, P. Rempp, L. Grubisic, J. Polym. Sci., Polym.

Lett. Ed. 3, 77 (1965); polystyrene standards in a molecular weight range of 600 to 10,000,000; determination of the calibration curve according to the following equation:

$$\log([\eta]\cdot M) = f(V_E)$$

$[\eta]$ = limiting viscosity number, determined in methylene chloride at 25° C. in an Ubbelohde capillary viscometer,
M = molecular weight
$V_E$ = elution volume in 5 ml units).

Preferred polar organic solvents for the process according to the invention are solvents consisting of at least 50% by weight of tert.-butanol. Tert.-butanol by itself is the preferred solvent.

Suitable radical-forming polymerisation initiators for the process according to the invention are, for example, organic peroxides, peresters and azo compounds, such as, for example, benzoyl peroxide, lauryl peroxide, tert.-butyl perpivalate, tert.-amyl perpivalate, cyclohexyl peroxydicarbonate, azobisisobutyronitrile and azobisisovaleric acid derivatives.

The invention also relates to gel-free ethylene terpolymers having a molecular weight $\overline{M}_w$, determined as a weight average, of 100,000 to 1,500,000, preferably 200,000 to 500,000, and containing:
a) 1 to 59% by weight of copolymerised ethylene,
b) 40 to (99-c) % by weight of copolymerised units of at least one vinyl ester of the formula

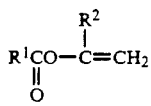

and
c) 1 to 59% by weight of copolymerised units of at least one monomer of the formulae

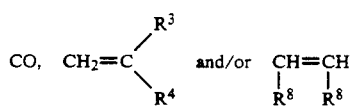

wherein substituents $R^1$ to $R^9$ have the above-mentioned meaning.

The invention also relates to those terpolymers mentioned above which have a content of 50 ppm to 1% by weight of a copolymerised (meth)acryloyl compound containing at least 2 acryloyl or methacryloyl groups per molecule.

The terpolymers according to the invention are distinguished, inter alia, by high tensile strength, a low tendency towards tackiness, unproblematical processibility (injection-mouldability) and high resistance to oil and thermal effects. In general they have Mooney viscosities (measured according to DIN 53 523) of 20 to 60, preferably 20 to 50 (ML-4/100° C.).

The terpolymers according to the invention can be cross-linked peroxidically and, where appropriate, aminically via functional groups such as —CO₂H, —OH or epoxides, or ionically via metal ions.

The terpolymers according to the invention can be used in the non-vulcanised or the vulcanised state. Preferred examples of their use in the non-vulcanised state are their use as flow improvers for lubricants and hydraulic oils (such as, for example, middle distillates according to DIN 7728 -T1), as adhesive binders, in particular for hot melt adhesives, and as a (plasticising) compounding component for thermoplastics, thermosetting plastics and rubbers. The terpolymers according to the invention having vinyl ester contents of higher than 75% by weight can in particular be used as compounding components for other thermoplastics, such as, for example, for polyolefins or polyurethanes.

During vulcanisation the terpolymers according to the invention display a low degree of bubble formation and superior mould releasability under heat to the products of the prior art. The vulcanisates are distinguished by higher tensile strength and elongation at break as well as more advantageous tensile moduli. In particular terpolymers having a vinyl ester content of 75 to 98% by weight are suitable for the production of particularly flame-resistant and oil-resistant articles. They can be used for the production of coverings, for example, for cables, as sheet products, coating materials and for the modification of other plastics, such as, for example, cellulose esters or polyvinyl chloride.

The vulcanised ethylene terpolymers according to the invention can be used for the production of moulded articles, sheet products and coverings of all kinds, such as for example for the production of sealings, outer sheaths of cables, cable inner lines, insulating means, conveyor belts and hoses.

The invention also relates to the use of the ethylene terpolymers according to the invention for the production of non-vulcanised or vulcanised moulded articles.

For the purposes of the invention "vulcanised" means that on extracting the terpolymer for 10 hours in a Soxhlet apparatus using toluene as the extracting agent less than 3, and preferably less than 1% by weight, based on the terpolymer, can be extracted.

EXAMPLES

Example 1

Ethylene/vinyl acetate/maleic acid 2-cyanoethyl semi-ester (MACE) copolymer

A cascade of autoclaves consisting of four series-connected stirred autoclaves each having a capacity of 5 l is continuously charged with 720 g/h of ethylene, a mixture A (1200 ml/h) consisting of 6000 g of vinyl acetate (d=0.79 g/mol), 9600 g of tert.-butanol and 394 g of MACE, and an initiator solution B (100 ml/h) consisting of 300 g of vinyl acetate, 500 g of tert.-butanol and 8 g of tert.-butyl perpivalate.

Mixtures A and B and ethylene are fed into autoclave 1 via a premix autoclave. The product stream passes through all the autoclaves. The internal reactor temperatures are T1=70° C., T2=73° C., T3=75° C. and T4=85° C. The operating pressure is 300 bar. When equilibrium is reached samples are taken from the individual autoclaves through sluices. Unused ethylene is depressurised with caution and discharged. The degassed samples have solids contents of 15 to 48% by weight. The Mooney viscosity is 22 (ML 4/100° C.); (VA content: 50.8% by weight, ethylene content: 47.0% by weight, MACE content (copolymerised units) 2.2% by weight).

The average residence time was 9 hours.

EXAMPLE 2

Ethylene/vinyl acetate/maleic acid 2-cyanoethyl semi-ester (MACE)/3-methoxybutyl acetate (MDBA) copolymer.

The cascade of autoclaves of example 1 is continuously charged with 458 g/h of ethylene, a mixture A (1200 ml/h) consisting of 7800 g of vinyl acetate, 9000 g of tert.-butanol, 900 g of MDBA and 30 g of MACE and a mixture B (100 ml/h) consisting of 600 g of vinyl acetate, 600 g of tert.-butanol and 9 g of tert.-butyl perpivalate.

The internal reactor temperatures are T1=64° C., T2=68° C., T3=73° C. and T4=80° C. 150 g/h of ethylene are subsequently metered into autoclave 3. The solids contents are between 5 and 40% by weight, the Mooney viscosity is 19 (ML 4/100° C.); (VA content: 51% by weight, ethylene content: 27% by weight, MOBA content: 20% by weight and MACE content: 4% by weight). The average residence time was 7 hours.

EXAMPLE 3

Ethylene/vinyl acetate/ethyl acrylate copolymer

The cascade of autoclaves of Example 1 is continuously charged with 458 g/h of ethylene, a mixture A (2000 ml/h) consisting of 6.3 kg of vinyl acetate (d=0.79 g/cm$^3$), 9 kg of tert.-butanol and 2.7 kg of ethyl acrylate (d=0.923818 g/cm$^3$) and a mixture B (1200 ml/h) consisting of 0.6 kg of vinyl acetate, 0.6 kg of tert.-butanol and 9 g of tert.-butyl perpivalate. The internal reactor temperatures are T1=64° C., T2=68° C., T3=73° C. and T4=80° C. The operating pressure is 300 bar. When equilibrium is reached samples are taken from the autoclaves through sluices. Unused ethylene is depressurised with caution and discharged. The degassed samples have solids contents of 7 to 26% by weight; the Mooney viscosity is 20 (ML-4/100° C.). The average residence time was 6 hours.

EXAMPLE 4

Ethylene/vinyl acetate/methyl acrylate copolymer

The cascade of autoclaves of example 1 is continuously charged with 900 g/h of ethylene, a mixture A (2000 ml/h) consisting of 9 kg of tert.-butanol, 5 kg of vinyl acetate and 4 kg of methyl acrylate (d=0.9558 g/cm$^3$), and a mixture B (120 ml/h) consisting of 0.6 kg of vinyl acetate, 0.6 kg of tert.-butanol and 9 g of tert.-butyl perpivalate.

The internal reactor temperatures are T1=63° C., T2=68° C., T3=74° C. and T4=85° C. The operating pressure is 310 bar. When equilibrium is reached samples are taken from the autoclaves through sluices. Unused ethylene is depressurised with caution and discharged. The degassed samples have solids contents of 4 to 24% by weight. The Mooney viscosity is 19 (ML-4/100° C.). The average residence time was 6 hours.

EXAMPLE 5

Ethylene/vinyl acetate/3-methoxybutyl acrylate (MOBA copolymer)

The cascade of autoclaves of example 1 is continuously charged with 458 g/h of ethylene, a mixture A (2000 ml/h) consisting of 9000 g of vinyl acetate (d=0.79 g/ml), 9000 g of tert.-butanol and 800 g of MOBA (d=0.981 g/ml), a solution B (120 ml/h) consisting of 600 g of vinyl acetate and 600 g of tert.-butanol and a mixture C (100 ml/h) consisting of 300 g of MOBA, 547 g of tert.-butanol and 6 g of tert.-butyl perpivalate. Mixture C is metered into autoclave 3 and all the other monomers or monomer mixtures (mixture A, solution B and ethylene) are metered into autoclave 1 via the premix autoclave.

The product stream flows through all autoclaves. The internal reactor temperatures are T1=64° C., T2=68° C., T3=73° C. and T4=80° C. The operating pressure is 300 bar. When equilibrium is reached samples are taken from the individual autoclaves through sluices. Unused ethylene is depressurised with caution and discharged. The degassed samples have solids contents of 15 to 48% by weight. The Mooney viscosity is 19 (ML-4/100° C.). The average residence time was 7 hours.

EXAMPLE 6

Ethylene/vinyl acetate/acrylic acid copolymer

The cascade of autoclaves of example 1 is continuously charged with 458 g/h of ethylene, a mixture A (2000 ml/h) consisting of 9000 g of vinyl acetate (d=0.79 g/ml), 9000 g of tert.-butanol and 180 g of acrylic acid (d=1.051 g/ml) and an initiator solution B (120 ml/h) consisting of 600 g of vinyl acetate, 600 g of tert.-butanol and 9 g tert.-butyl perpivalate. The monomers or monomer mixtures (mixture A, initiator solution B and ethylene) are introduced into autoclave 1 via the premix autoclave. The product stream passes through all autoclaves. The internal reactor temperatures are T1=67° C., T2=70° C., T3=73° C. and T4=80° C. The operating pressure is 300 bar. When equilibrium is reached samples are taken from the individual autoclaves through sluices. Unused ethylene is depressurised with caution and discharged. The degassed samples have solids contents of 15 to 40% by weight. The Mooney viscosity is 14(ML-4/100° C.); (VA content: 75% by weight, ethylene content: 20% by weight, acrylate content: 5% by weight). The average residence time was 7 hours.

EXAMPLE 7

Ethylene/vinyl acetate/glycidyl methacrylate copolymer

The cascade of autoclaves of example 1 is continuously charged with 458 g/h of ethylene, a mixture A (1200 ml/h) consisting of 6000 g of vinyl acetate (d=0.79 g/ml), 1000 g of tert.-butanol and 150 g of glycidyl methacrylate (d=1.042 g/ml), a solution B (100 ml/h) consisting of 300 g of vinyl acetate and 500 g of tert.-butanol and a mixture C (100 ml/h) consisting of 150 g of glycidyl methacrylate, 657 g of tert.-butanol and 8 g of tert.-butyl perpivalate. Mixture C is introduced into autoclave 3 and all the other monomers or monomer mixtures (mixture A, solution B and ethylene) are introduced into autoclave 1 via the premix autoclave. The product stream passes through all autoclaves. The internal reactor temperatures are T1=70° C., T2=73° C., T3=75° C. and T4=85° C. The operating pressure is 300 bar. When equilibrium is reached samples are taken from the individual autoclaves through sluices. Unused ethylene is depressurised with caution and discharged. The degassed samples have solids contents of 15 to 30% by weight. The Mooney viscosity is 4 (ML-4/100° C.); (glycidyl methacrylate content: 8.5% by weight).

The average residence time was 6 hours.

EXAMPLE 8

Ethylene/vinyl acetate/carbon monoxide copolymer

The cascade of autoclaves of example 1 is charged continuously with 1000 g/h of ethylene, a mixture A (2000 ml/h) consisting of 5000 g of vinyl acetate (d=0.79 g/mol) and 5000 g of tert.-butanol and with an initiator solution B (120 ml/h) consisting of 360 g of vinyl acetate, 640 g of tert.-butanol and 12.0 g of tert.-butyl perpivalate.

The product stream passes through all the autoclaves. The internal reactor temperatures are T1=70° C., T2=73° C., T3=77° C. and T4=80° C. The operating pressure is adjusted to 300 bar.

Then 16 g/h of carbon monoxide are fed into the third autoclave. When equilibrium is reached samples are taken from the individual reactors through sluices. Unused ethylene and carbon monoxide are depressurised with caution and discharged. The degassed samples have solids contents of 2 to 18% by weight. The Mooney viscosity is 15 (ML-4/100° C.); (VA content: 65% by weight, CO content: 5 mol %).

The average residence time was 7 hours.

We claim:

1. Continuous solution polymerisation process for the production of gel-free ethylene terpolymers having a molecular weight $M_w$, determined as a weight average, of 100,000 to 1,500,000, and containing
   a) 1 to 59% by weight of copolymerized ethylene,
   b) 40 to (99-c)% by weight of copolymerized units of at least one vinyl ester of the formula

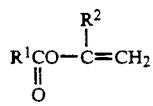

wherein
   $R^1$ denotes $C_1$-$C_6$-alkyl and
   $R^2$ denotes hydrogen; $C_1$-$C_6$-alkyl which can be substituted by —CN, —SCN or halogen (fluorine, chlorine or bromine) and
   c) 1 to 59% by weight of copolymerized units of at least one monomer of the formulae

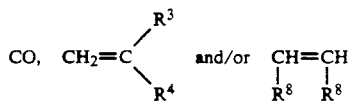

wherein
   $R^3$ denotes hydrogen, $C_1C_6$-alkyl, —CN or halogen (fluorine, chlorine or bromine) or —COOR$^5$,
   $R^4$ denotes —COOH, —CONH$_2$, —COOCH$_2$OH,

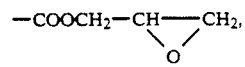

—COOCH$_2$CH=CH$_2$, —COOCH$_2$CH$_2$Cl, —CONHCH=CH$_2$, —COO-CO—C(CH$_3$)=CH$_2$, —COOR$^5$, —CN or halogen (fluorine, chlorine, or bromine),
   $R^5$ denotes [R$^6$O]$_n$R$^7$,
   $R^6$ denotes $C_1$-$C_6$-alkylene,
   $R^7$ denotes hydrogen, $C_1$-$C_6$-alkyl, —CN, —OR$^9$, —COR$^9$ or halogen (fluorine, chlorine or bromine)
   $R^8$ denotes —CO$_2$R$^5$, —CN or halogen (fluorine, bromine or chlorine), or both $R^8$ substituents together denote —CO—O—CO—, —CO—N-H—CO— or

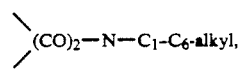

$R^9$ denotes hydrogen or $C_1$-$C_6$-alkyl and
   n denotes an integer from 1 to 10,
   the percentages in each case relating to the sum of components a+b+c, characterized in that the reaction is carried out
   in a cascade of 3 to 10 reactors,
   in a polar organic solvent with a solvent concentration, based on the sum of monomers+solvent, of between 20 to 75% by weight,
   under pressures of 100 to 1,000 bar,
   at temperatures of 30° to 150° C.,
   in the presence of 0.02 to 1.5% by weight, based on the quality of monomers employed, of a polymerisation initiator,
   until a degree of conversion, based on the vinyl ester b), of 40 to 90% by weight is reached.
   and wherein the polymerisation is carried out in the presence of 50 ppm to 1% by weight, based on the quantity of polymerizable monomers employed, of (meth)acryloyl compounds containing at least 2 acryloyl or methacryloyl groups per molecule.

2. Process according to claim 1 characterised in that the polymerisation is carried out in the presence of 200 ppm to 1% by weight of a (meth)acryloyl compound containing at least 2 acryloyl or methacryloyl groups per molecule.

3. Process according to claim 1 according to which acrylic acid anhydride or methacrylic acid anhydride are selected as the (meth)acryloyl compound.

* * * * *